June 18, 1963 G. A. GRUBB 3,093,978
ABSORPTION REFRIGERATION APPARATUS
Filed Aug. 29, 1961 3 Sheets-Sheet 1

INVENTOR.
BY
his ATTORNEY

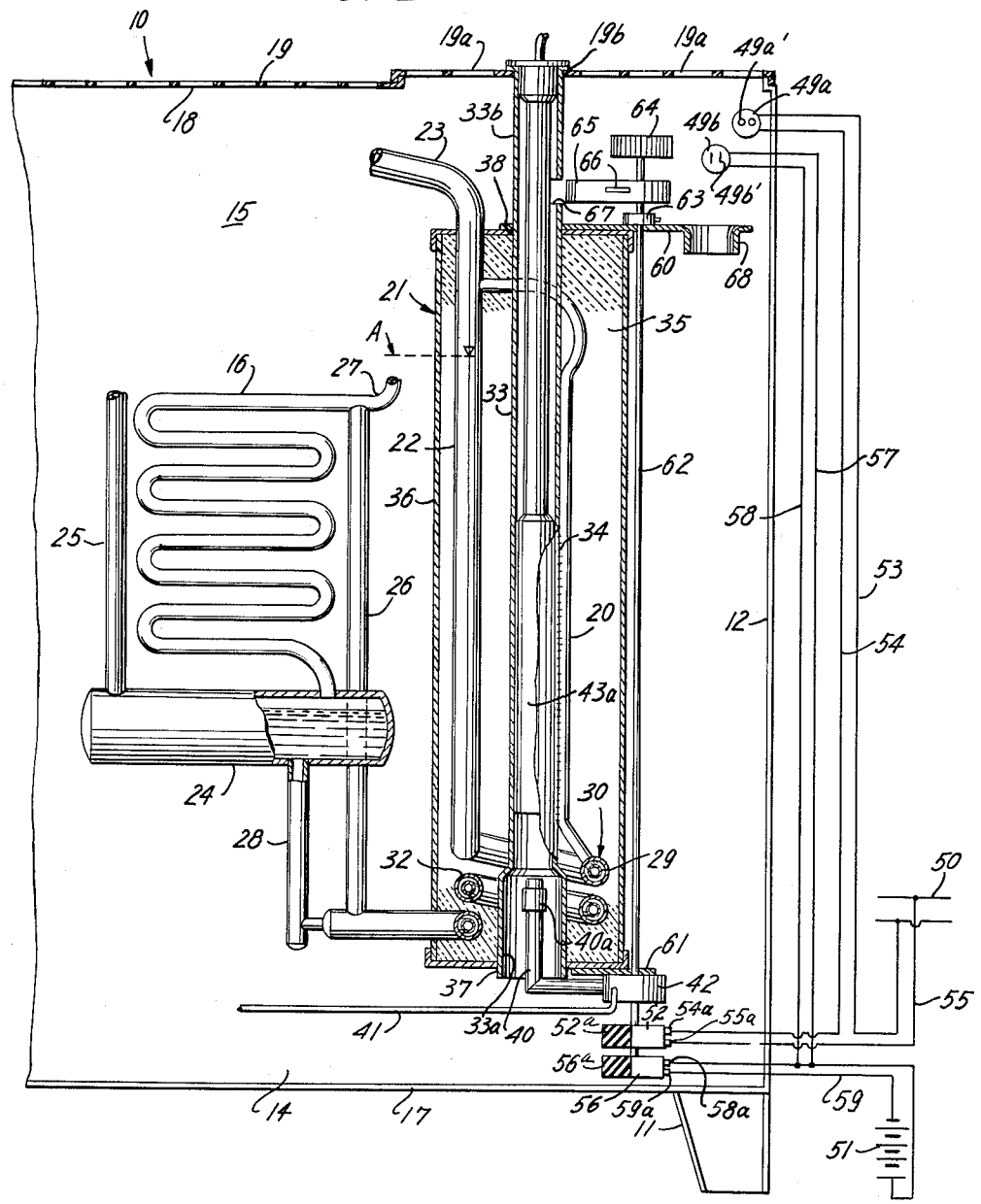

June 18, 1963  G. A. GRUBB  3,093,978
ABSORPTION REFRIGERATION APPARATUS
Filed Aug. 29, 1961  3 Sheets-Sheet 3
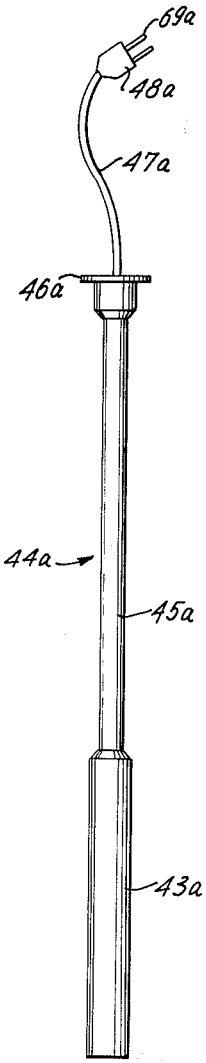
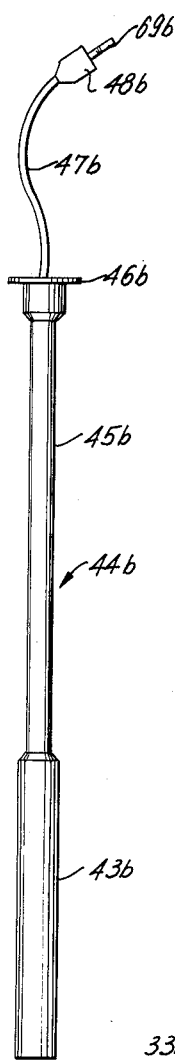
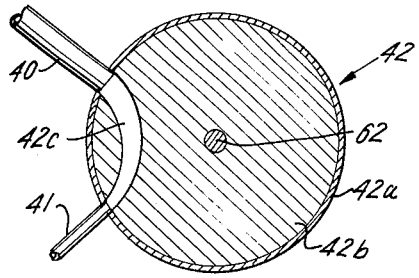
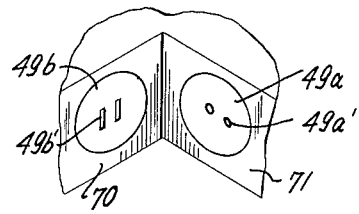
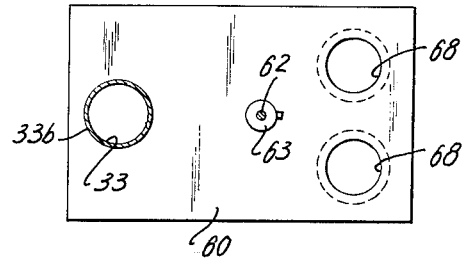
INVENTOR.
BY
his ATTORNEY

United States Patent Office 3,093,978
Patented June 18, 1963

3,093,978
ABSORPTION REFRIGERATION APPARATUS
Gunnar Axel Grubb, Bromma, Sweden, assignor to Aktiebolaget Electrolux, Stockholm, Sweden, a corporation of Sweden
Filed Aug. 29, 1961, Ser. No. 134,760
Claims priority, application Sweden Sept. 22, 1960
6 Claims. (Cl. 62—236)

My invention relates to absorption refrigeration apparatus of the kind in which vapor is expelled out of solution by heating.

It is an object of the invention to provide for absorption refrigeration apparatus improved heating structure for conveniently heating the apparatus by different sources of heat.

Another object is to provide for a vapor-expulsion unit of absorption refrigeration apparatus an electrical heating element and a fluid fuel burner for heating a heating tube of heat receiving structure and controlling the sources of heat for selectively rendering either the electrical heating element or the fuel burner operable to heat the heating tube.

A further object is to provide a fluid fuel burner and several electrical heating elements adapted to be energized with different kinds of electrical energy for heating a heating flue of heat receiving structure of absorption refrigeration apparatus and controlling the sources of heat for selectively rendering a single source of heat operable to heat the heating tube.

The invention, together with the above and other objects and advantages thereof, will be more fully understood upon reference to the following description and the accompanying drawing forming a part of this specification, and in which:

FIG. 2 is a view similar to FIG. 1 with the refrigeration apparatus adapted to be operated by an electrical heating unit;

FIG. 3 is a fragmentary sectional view taken at line 3—3 of FIG. 1;

FIGS. 4 and 5 are elevational views of electrical heating units like the heating unit shown in FIG. 2;

FIG. 6 is a fragmentary perspective view of a detail which may be embodied at the rear of the refrigerator shown in FIGS. 1 and 2; and FIG. 7 is a fragmentary view taken at line 7—7 of FIG. 1.

Figure 1:
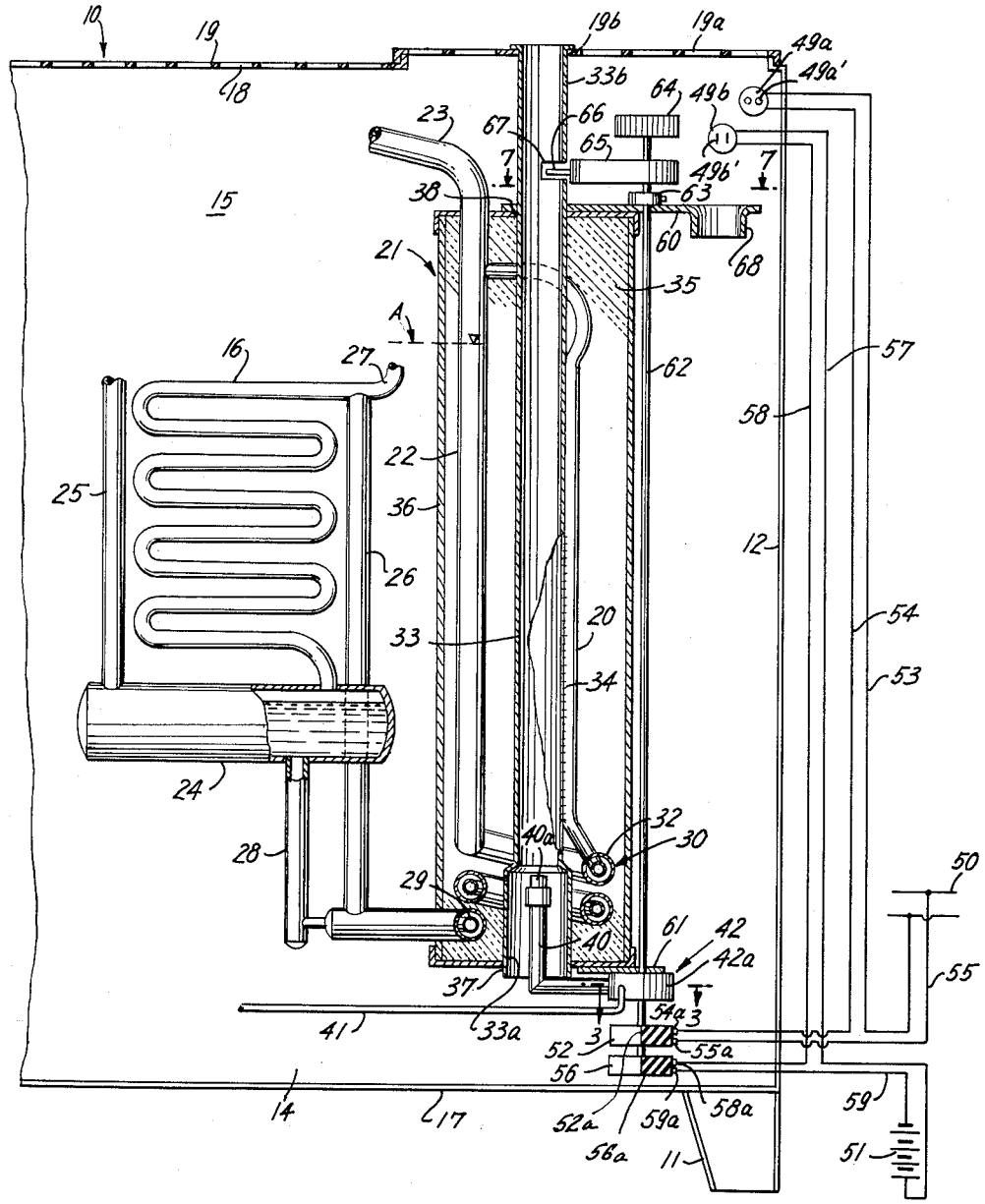
FIG. 1 illustrates more or less diagrammatically parts of absorption refrigeration apparatus to which the invention is applied, the apparatus being shown in an upright space at the rear of a refrigerator and adapted to be operated by a fluid fuel burner.

Referring to FIG. 1, the invention is shown in connection with a refrigerator which comprises a cabinet 10 supported on legs 11. The lateral side walls 12 of the cabinet extend rearward beyond a rear plate 14 to provide a vertical compartment 15 in which parts of absorption refrigeration apparatus are housed. During operation of the refrigeration apparatus, natural draft circulation of air is induced to effect air-cooling of an absorber 16 and a condenser (not shown), such cooling air flowing upward through an opening 17 in the bottom of the cabinet and passing through openings 18 in an apertured rear part of the top 19 of the cabinet.

The absorption refrigeration apparatus is of a uniform pressure type containing an inert gas or pressure equalizing gas. Refrigerant vapor is expelled from absorption liquid in a vapor lift pipe 20 of a vapor-expulsion unit 21 and passes through the upper part of a standpipe 22 and a conduit 23 to a condenser. The refrigerant vapor, such as ammonia, is liquefied in the condenser and flows into an evaporator in which the refrigerant evaporates and diffuses into an inert gas, such as hydrogen, to produce a refrigerating effect within the thermally insulated interior of the cabinet 10. The resulting gas mixture of refrigerant and inert gas flows from the evaporator to an absorber which may be of an air-cooled type including the coil 16 and an absorber vessel 24 to which the lower end of the coil is connected, such gas mixture entering the absorber vessel 24 through a conduit 25.

In the absorber refrigerant is absorbed from the gas mixture into absorption liquid, such as water, which is delivered thereto through a conduit 26, and the absorption liquid enriched in refrigerant passes into the absorber vessel 24. The inert gas is returned from the absorber to the evaporator in the path of flow including a conduit 27, and the enriched absorption liquid is conducted through a conduit 28 and inner pipe 29 of a liquid heat exchanger 30 to the vapor-expulsion unit 21.

The absorption liquid from which refrigerant vapor has been expelled flows by gravity from standpipe 22 through the outer pipe 32 of liquid heat exchanger 30 and conduit 26 into the upper part of absorber coil 16. The liquid surface level A maintained in standpipe 22 is at a higher level than the region at which liquid is introduced into absorber 16 from the upper end of conduit 26. In order to simplify the drawing, the condenser, evaporator and connections therefor have not been shown, such parts being well known and their illustration not being necessary for an understanding of this invention.

Absorption solution enriched in refrigerant flows from the absorber vessel 24 through conduit 28 and inner pipe 29 of liquid heat exchanger 30 into the lower end of vapor lift pipe 20 which is in thermal exchange relation with a heating tube 33 at 34, as by welding, for example.

The part of the pump or lift pipe 20 in thermal exchange relation with the heating tube 33 may be referred to as the vapor-forming part in which vapor bubbles are formed due to heat derived from the heating tube. Due to the formation of these vapor bubbles which tend to collect and become larger and larger, liquid in the vapor lift pipe 20 becomes segregated, whereby slugs of liquid are caused to rise in the lift pipe by vapor lift action. Vapor generated in the vapor lift pipe 20 flows from the upper end thereof through the upper part of standpipe 22 into conduit 23 and passes to the condenser, as previously explained.

The vapor-expulsion unit 21 in its entirety, together with a major portion of the liquid heat exchanger 30, are embedded in a body of insulation 35 retained in a metal shell or casing 36 having an opening 37 at the bottom thereof, the shell being rectangular or circular in horizontal cross-section. The heating tube 33, which is embedded in the insulation 35, is formed with an enlarged bottom section 33a which projects through the bottom opening 37 in the casing 36. The upper end of the heating tube 33 projects through a top opening 38 in the casing 35 and includes an extension 33b which terminates at the top 19 of the cabinet. The rear part of the top 19 of the cabinet is provided with a removable apertured section 19a having an opening 19b through which the upper extension 33b of the heating tube extends.

As shown in FIG. 1, a gaseous fuel burner 40, which may be supported in any suitable manner in the enlarged bottom section 33a of the heating tube 33, is provided with a burner head 40a positioned at the top part of the enlarged tube section. A gap of suitable size is formed between the burner 40 and bottom heating tube section 33a to provide a passage for secondary air which will insure complete combustion of the mixture of gaseous fuel and primary air discharged from the burner head 40a. The burner 40 is connected to a source of supply of gaseous fuel by a pipe 41 in which is connected a valve 42.

In accordance with my invention, the heating tube 33 may be employed as a component part of heating structure adapted to be employed with a gaseous fuel burner in the manner just described and illustrated in FIG. 1; and also as a component part of heating structure adapted to be employed with an electrical heating unit in the manner illustrated in FIG. 2. In FIG. 2, in which parts similar to those shown in FIG. 1 and described above are referred to by the same reference numerals, an electrical heating element 43a is positioned within the heating tube 33. The heating tube 33 snugly receives the heating element 43a which may comprise a cartridge housing an electrical wire or the like having a relatively high resistance that generates heat when connected to a source of electrical energy.

The heating element 43a forms the bottom part of a portable heating unit 44a which is positioned within the heating tube 33 form its upper open end. The heating unit 44a includes a narrower upper part 45a which may be formed of suitable insulating material and a collar having a flange 46a for holding the heating unit at the upper open end of the heating tube 33. The heating unit 44a is of such length that the heating element 43a will be positioned in that part of heating tube 33 to which the pump or lift pipe 20 is heat conductively connected thereto at 34. As shown in FIG. 4, the heating unit 44a is connected by an electrical cord 47a to a terminal fitting or plug 48a adapted to be connected to an outlet socket 49a provided in any suitable manner in the upper part of the rear vertical compartment 15 of the cabinet 10.

In accordance with my invention, I provide the heating unit 44a for the heating tube 33 which is adapted to be connected to a conventional source of electrical supply 50 and a second heating unit 44b for the heating tube 33 which is adapted to be connected to a battery 51. When the heating unit 44a is positioned in the heating tube 33 and its terminal fitting 48a is connected to the outlet socket 49a, a circuit will be completed for the heating element 43a when switch 52 is closed. From one side of the source of electrical supply 50 this circuit will include conductors 53, 54, switch 52 and conductor 55 back to the other side of the source of electrical supply 50.

The heating unit 44b for battery operation is similar to the heating unit 44a and includes a heating element 43b, insulating portion 45b, collar 46b, cord 47b and terminal fitting 48b. When the heating unit 44b is positioned in the heating tube 33 and its terminal fitting 48b is connected to an outlet socket 49b, a circuit will be completed for the heating element 43b when switch 56 is closed. From one terminal of the battery 51 this circuit will include conductors 57 and 58, switch 56 and conductor 59 back to the other terminal of the battery.

Plates 60 and 61, which are respectively fixed to the top and bottom of the casing 36, are apertured to receive a vertical shaft or rod 62 to which is fixed a collar 63 adapted to rest on the top plate 60. The rod or shaft 62 is provided with a control knob 64 at its upper end. To a part of the shaft 62 below the knob 64 and above top plate 60 is fixed an arm 65. A flat horizontal part 66 which projects radially outward from the periphery of the arm 65 can be moved into and from a slotted portion 67 of the heating flue extension 33b.

The valve 42 for controlling the supply of gaseous fuel to the burner 40 includes a casing 42a of cylindrical shape which may be fixed to the bottom plate 61. Within the casing is positioned a rotatable valve member 42b fixed to the shaft 62. The valve member 42b is formed with a passage 42c which connects the pipe 41 and burner 40 when the valve member is in the position illustrated in FIG. 3.

Each of the switches 52 and 56 may comprise a member of cylindrical shape which is formed of electrically conductive material and fixed to the shaft 62 and insulated therefrom in any suitable manner. Brushes 54a and 55a, to which the conductors 54 and 55 are connected, are adapted to bear against the periphery of switch 52; and brushes 58a and 59a, to which the conductors 58 and 59 are connected, are adapted to bear against the periphery of switch 56. The peripheries of the switch members 52 and 56 are provided with insulating sections 52a and 56a, respectively, over which the brushes move for a part of each complete turn of the shaft 62.

When the knob 64 is turned so that valve 42 will be open and in the position illustrated in FIG. 3 to deliver gaseous fuel to the burner 40, the outer flat part 66 of arm 65 will be positioned in the slotted portion 67 of the heating tube extension 33b. Therefore, when it is desired to operate the refrigeration apparatus with the gas burner 40, it is necessary to remove either one of the heating units 44a or 44b from the heating flue 33 if this already has not been done. Also, the flat member 66 projecting into the heating tube extension 33a during gas operation of the refrigeration apparatus will prevent anyone from positioning a heating unit in the heating tube. During gas operation, the heating units 44a and 44b may be stored in the rear apparatus compartment 15. As shown in FIGS. 1, 2 and 7, the plate 60 is formed with a pair of openings 68 through which the heating units may be inserted, the flanges 46a and 46b of the heating units being sufficiently large to engage the plate 60 at the openings and support the heating units.

Desirably, the relationship of valve member 42b and the insulating sections 52a and 56a of the switches is such that in a first position of knob 64 the valve 42 is partly or fully open and the brushes engage the insulating sections 52a and 56a of the switch members 52 and 56, and in a second position of knob 64 the valve 42 is closed and the brushes are removed from the insulating sections 52a and 56a of the switch members. Hence, the control knob 64 can be moved either to one of two positions, namely, a first valve "on" position, or a second position which will render either one of the heating units 44a or 44b operable to effect heating of the refrigeration apparatus when it is positioned in the heating tube 33. In the second position of control knob 64 the flat part 66 of arm 65 will be in the position illustrated in FIG. 2 to permit a heating unit to be inserted into the heating tube.

In FIGS. 4 and 5 it will be seen that the terminal fitting 48a for the heating unit 44a is provided with round pins 69a while the terminal fitting 48b for the heating unit 44b is provided with flat blades 69b. The outlet socket 49a associated with the conventional source of electrical supply 50 is formed with round openings 49a' adapted to receive the pins 69a of the terminal fitting 48a, while the outlet socket 49b associated with the battery 51 is formed with narrow rectangular slots 49b' adapted to receive the flat blades 69b of the terminal fitting 48b. Hence, the heating units 44a and 44b, each of which is designed to operate with a particular kind of electrical energy, cannot inadvertently be connected to the wrong kind of electrical energy.

The outlet sockets 49a and 49b may be positioned in the rear apparatus compartment 15 in different walls 70 and 71 which are perpendicular to one another, as shown in FIG. 6. The outlet sockets may be placed close to the junction of the walls 70 and 71 so that when the terminal fitting of one heating unit is connected to its outlet socket, that terminal fitting will be located in front of the other outlet socket and prevent the other terminal fitting from being positioned therein. Hence, even when the control knob 64 is moved to such a position that either one of the electrical heating units will be rendered operable to effect operation of the refrigeration apparatus, only one of the heating units can be connected to its associated source of electrical supply when the outlet sockets are located in the rear apparatus compartment in the manner illustrated in FIG. 6 and described above.

By providing the removable apertured section 19a at the rear part of the top of the cabinet, easy access to the upper part of the rear storage space can be obtained to manipulate control knob 64 and shift an electrical heating element from the heating flue 33 to the plate 60 for storage in one of the openings 68 therein or from such storage position to the heating flue 33.

While I have shown and described a single embodiment of my invention, it will be apparent that modifications and changes may be made without departing from the spirit and scope of the invention, as pointed out in the following claims.

I claim:

1. In absorption refrigeration apparatus, an upright shell having an upstanding side wall and a top and bottom and insulation therein, a vapor-expulsion unit embedded in the insulation, said vapor-expulsion unit having at least one part in which vapor is expelled from solution by heating, an upright heating tube which extends through said shell, the top and bottom of said shell having openings communicating with the upper and lower ends of said heating tube, means heat conductively connecting the exterior surfaces of said tube and said part along a zone which extends lengthwise of said tube, said heating tube being hollow, an electrical heating element, means for removably positioning said heating element in said tube through its upper open end to locate said heating element vertically at said zone for operating the apparatus electrically, means including a fluid fuel burner positioned at the lower end of said heating tube for operating the apparatus with a combustible fuel mixture, the part of said heating tube at said zone having its inner surface in the path of flow of combustion gases produced during operation of the burner, and control means for rendering said electrical heating element operable to heat said heating tube and for rendering said fluid fuel burner operable to heat said heating tube, said electrical heating element being removed from said heating tube at its upper end when said fluid fuel burner is rendered operable to heat said heating tube, said control means including structure for blocking said heating tube to prevent the insertion of said electrical heating element therein responsive to rendering said fluid fuel burner operable to heat said heating tube.

2. In absorption refrigeration apparatus, an upright shell having an upstanding side wall and a top and bottom and insulation therein, a vapor-expulsion unit embedded in the insulation, said vapor-expulsion unit having at least one part in which vapor is expelled from solution by heating, an upright heating tube which extends through said insulation between the top and bottom of said shell, the top and bottom of said shell having openings communicating with the upper and lower ends of said heating tube, means heat conductively connecting the exterior surfaces of said tube and said part along a zone which extends lengthwise of said tube, said heating tube being hollow, an electrical heating element, means for removably positioning said heating element in said tube through its upper open end to locate said heating element vertically at said zone for operating the apparatus electrically, means including a fluid fuel burner positioned at the lower end of said heating tube for operating the apparatus with a combustible fuel mixture, the part of said heating tube at said zone having its inner surface in the path of flow of combustion gases produced during operation of the burner, control means for rendering said electrical heating element operable to heat said heating tube and for rendering said fluid fuel burner operable to heat said heating tube, said electrical heating element being removed from said heating tube at its upper end when said fluid fuel burner is rendered operable to heat said heating tube, an electrical circuit for said electrical heating element having switch means and a fluid fuel line for said burner having a valve, and said control means including a manually operable part at the vicinity of the upper open end of said heating tube which is movable to two positions, said control means being effective to close said switch means and shut said valve in one position of said part and to open said switch means and open said valve in the other position of said part.

3. In absorption refrigeration apparatus, an upright shell having an upstanding side wall and a top and bottom and insulation therein, a vapor-expulsion unit embedded in the insulation, said vapor-expulsion unit having at least one part in which vapor is expelled from solution by heating, an upright heating tube which extends through said insulation between the top and bottom of said shell, the top and bottom of said shell having openings communicating with the upper and lower ends of said heating tube, means heat conductively connecting the exterior surfaces of said tube and said part along a zone which extends lengthwise of said tube, said heating tube being hollow, an electrical heating element, means for removably positioning said heating element in said tube through its upper open end to locate said heating element vertically at said zone for operating the apparatus electrically, means including a fluid fuel burner positioned at the lower end of said heating tube for operating the apparatus with a combustible fuel mixture, the part of said heating tube at said zone having its inner surface in the path of flow of combustion gases produced during operation of the burner, control means for rendering said electrical heating element operable to heat said heating tube and for rendering said fluid fuel burner operable to heat said heating tube, said electrical heating element being removed from said heating tube at its upper end when said fluid fuel burner is rendered operable to heat said heating tube, another electrical heating element and an electrical circuit for each of said elements, switch means for each of said circuits, and a fluid fuel line for said burner having a valve, and said control means including a manually movable part which is movable to two positions, said control means being effective to close both of said switch means and shut said valve in one position of said part and to open both of said switch means and open said valve in the other position of said part, each of said electrical circuits having an outlet socket, each of said electrical heating elements having a terminal fitting, said outlet sockets being positioned so that either terminal fitting in its outlet socket will prevent the other outlet socket from receiving the other terminal fitting.

4. A refrigerator comprising a cabinet having an apparatus space at an upright wall thereof, an apertured part, means for removably supporting said apertured part over the apparatus spaced at the top of the cabinet, refrigeration apparatus including an upright shell positioned in the apparatus space, said shell having an upstanding side wall and a top and bottom and insulation therein, a vapor-expulsion unit embedded in the insulation, said vapor-expulsion unit having at least one part in which vapor is expelled from solution by heating, an upright heating tube which extends through said insulation between the top and bottom of said shell, the top and bottom of said shell having openings communicating with the upper and lower ends of said heating tube, the upper end of said heating tube terminating at the vicinity of the top of the cabinet, means heat conductively connecting the exterior surfaces of said tube and said part along a zone which extends lengthwise of said tube, said heating tube being hollow, an electrical heating element, means for removably positioning said heating element in said tube through its upper open end to locate said heating element vertically at said zone for operating the apparatus electrically, means including a fluid fuel burner positioned at the lower end of said heating tube for operating the apparatus with a combustible fuel mixture, the part of said heating tube at said zone having its inner surface in the path of flow of combustion gases produced during operation of the burner, control means for rendering said electrical heating element operable to heat said heating tube and for rendering said fluid fuel burner operable to heat said heating tube, said electrical heating element being removed from said heating tube at its upper end when said fluid fuel burner is rendered operable to heat said heating tube, and said control means including a manually movable control part in the apparatus space at the vicinity of the upper end of said heating tube, said control part being accessible upon removal of said apertured part.

5. Apparatus as set forth in claim 4 which includes another electrical heating element and an electrical circuit for each of said elements, switch means for each of said circuits and a fuel line for said burner having a valve, said movable control part being movable to two positions, said control means being effective to close both of said switch means and shut said valve in one position of said control part and to open both of said switch means and open said valve in the other position of said control part, each of said electrical circuits having an outlet socket in the upper part of the apparatus space, means in the upper part of the apparatus space for storing at least one of said electrical heating elements, and said electrical heating elements having terminal fittings which differ from one another, and one of said outlet sockets receiving only one of said terminal fittings and the other of said outlet sockets receiving only the other of said terminal fittings.

6. In absorption refrigeration apparatus, an upright shell having an upstanding side wall and a top and bottom and insulation therein, a vapor-expulsion unit embedded in the insulation, said vapor-expulsion unit having at least one part in which vapor is expelled from solution by heating, an upright heating tube which extends through said insulation between the top and bottom of said shell, the top and bottom of said shell having openings communicating with the upper and lower ends of said heating tube, means heat conductively connecting the exterior surfaces of said tube and said part along a zone which extends lengthwise of said tube, said heating tube being hollow, an electrical heating element, means for removably positioning said heating element in said tube through its upper open end to locate said heating element vertically at said zone for operating the apparatus electrically, means including a fluid fuel burner positioned at the lower end of said heating tube for operating the apparatus with a combustible fuel mixture, the part of said heating tube at said zone having its inner surface in the path of flow of combustion gases produced during operation of the burner, control means for rendering said electrical heating element operable to heat said heating tube and for rendering said fluid fuel burner operable to heat said heating tube, said electrical heating element being removed from said heating tube at its upper end when said fluid fuel burner is rendered operable to heat said heating tube, said heating tube being formed with an opening in its wall, and said control means including a part movable into the interior of said heating tube through the opening in its wall to block the insertion of said electrical heating element therein responsive to rendering said fluid fuel burner operable to heat said heating tube.

References Cited in the file of this patent
UNITED STATES PATENTS

| | | |
|---|---|---|
| 2,772,544 | Lenning | Dec. 4, 1956 |
| 2,842,943 | Kogel et al. | July 15, 1958 |
| 3,000,196 | Kogel | Sept. 19, 1961 |